United States Patent [19]

Coffey

[11] Patent Number: 4,844,346
[45] Date of Patent: Jul. 4, 1989

[54] GROVE SPRAYER

[76] Inventor: Robert G. Coffey, 2300 Winter Park Rd., Winter Park, Fla. 32789

[21] Appl. No.: 184,590

[22] Filed: Apr. 21, 1988

[51] Int. Cl.$^4$ ............................ B05B 1/20; B05B 1/16
[52] U.S. Cl. ..................................... 239/166; 239/170
[58] Field of Search ................. 239/100, 66, 155, 163, 239/170, 164; 47/1.7, 1.5

[56] References Cited

U.S. PATENT DOCUMENTS

| 1,733,883 | 10/1929 | Jaeks | 47/1.7 |
| 1,900,837 | 3/1933 | Mills | 239/155 |
| 2,301,213 | 11/1942 | Kang | 47/1.7 |
| 3,830,014 | 8/1974 | Baker | 47/1.7 |
| 4,206,559 | 6/1980 | Randolph | 47/1.7 |
| 4,709,505 | 12/1987 | Lempa | 47/1.7 |

FOREIGN PATENT DOCUMENTS

| 242789 | 1/1963 | Australia | 47/1.7 |
| 81737 | 12/1976 | Australia | 47/1.7 |
| 49831 | 5/1939 | France | 47/1.7 |
| 255883 | 6/1946 | Switzerland | 47/1.7 |
| 197803 | 3/1976 | U.S.S.R. | 47/1.7 |

Primary Examiner—Andres Kashnikow
Assistant Examiner—Kevin P. Weldon
Attorney, Agent, or Firm—William M. Hobby, III

[57] ABSTRACT

A grove sprayer apparatus has a wheeled vehicle having a pump and a tank mounted thereon with the pump operatively connected to the tank. An upwardly extending hollow mast is attached to the vehicle and is operatively connected through the pump to the tank for the passage of liquid therethrough. A plurality of vertically spaced, horizontal, nozzle bearing boom arms, each having at least one operatively connected liquid control valve, are flexibly mounted to the mast such that spray is activated as the arms contact passing trees. The boom arms contact the passing trees in a manner profiling their aisle periphery surface and thus positioning the spray nozzles in the foliage such as to provide a full, saturating spray mist within the tree by directing the spray from the tank, through the mast, through the booms, and out the nozzles. As the spray machine continues forward and leaves the tree, the foliage pressure of that tree is released, and the booms return to their laterally, peripendicular off-position, thus deactivating the spray valves and stopping all spray generation outside the tree whereby no spray is generated in the outer atmosphere.

30 Claims, 3 Drawing Sheets

GROVE SPRAYER

BACKGROUND OF THE INVENTION

The present invention concerns an agricultural grove sprayer having spray nozzles placed to travel within the foliage of the grove tree and to spray a mist only within the grove tree. It is common practice for a grove sprayer to proceed down a service aisle and to create a high velocity, chemical cloud which is blasted outwardly toward the rows of passing trees bordering the aisleway regardless of tree gaps or size differentials. Upon contacting the trees the chemical cloud is slowed, chemicals drop, and much of the chemical liquid runs off the foliage on to the ground, and much of the chemical cloud is deflected upward into the atmosphere and deposited in surrounding areas with disastrous results. Also, during its exposed travel from the spray nozzles to the tree foliage the chemical cloud is subject to wind dispersion and to other atmospheric effects. Expensive, high-velocity, high noise polluting air jet blasts are extravagantly generated, and further, expensively manipulated such as to have a turbulent nature whereby violently to agitate and otherwise to maltreat the foliage such as to force therein the chemical spray for deposition on the inner foliage. Some does so deposit. Initial machinery costs are high as are operation costs, maintenance costs, and spray chemical and water losses. Efficiency is low. This invention eliminates these problems and discloses further improvements.

Prior U.S. patents which show grove sprayers include the Gardener U.S. Pat. No. 3,016,653, which shows an agricultural spraying device in which a bar trips a nozzle for spraying chemicals on weeds. The Jolly, Jr. U.S. Pat. No. 4,197,998 shows a self-leveling boom type sprayer. The Baker U.S. Pat. No. 3,830,014 shows steam ejecting boom arms using tree detecting valves.

It is an object of this invention to provide a system for environmentally efficient, chemical spray generating and pollution-free delivery.

Another object of this invention is to provide a manner of generating a chemical spray mist within the grove tree itself such that it is trapped and held therein for chemical deposition and thorough chemical soaking of the upper and lower foliage surfaces and of all the tree elements therein.

Another object of this invention is to provide a manner whereby the spray liquid and the particulates are removed within the tree through deposition and through the soaking and foliage filtration action whereby only relatively dry, filtered air escapes outwardly from the tree into the atmosphere.

Another object of this invention is to devise a method of spraying a grove tree from a continuously moving spray nozzle which acts as a traveling point generating source located within the tree itself.

Another object of this invention is to devise a spray machine which positions spray heads directly against or into the needy target area whereby no distance or space exists between the immediate spray generation zone and the object being sprayed.

Another object of this invention is to provide an agricultural sprayer of quiet, easy chemical spray generation and delivery means whereby no upwardly deflected, atmospheric chemical spray clouds or horizontally moving chemical drift clouds are formed.

Another object of this invention is to provide an agricultural sprayer utilizing spray means whereby are eliminated the commonly accepted inefficiencies of the environmentally polluting effects of airblast machine high velocity, foliage penetration, forced particle impinging, chemical foliage runoff, spray mist fall out and dispersion, and wind dissipation.

Another objection of this invention is to provide a maximally efficient grove spray machine employing foliage-internal spray generation nozzles and technique and without employing spray mist boost forces.

Another objective of this invention is to provide an agricultural grove sprayer incorporating means to spray the inside of a citrus tree without significant deposition of chemical spray residue outside the tree.

Another object of this invention is to provide a system for environmentally efficient, external chemical spray generation and delivery.

Another object of this invention is to provide an agricultural sprayer whereby grove trees may be externally sprayed throughout a grove from a consistent, maximally constant, spray nozzle distance from the trees.

Another object of this invention is to provide an agricultural grove sprayer incorporating means to obtain the economy of spraying simultaneously a tree interior and a tree exterior whereby two different and separate spray chemicals are simultaneously applied on the same tree and without intermingling.

Another object of this invention is to provide a spray machine to mass spray trees by their individual physical characteristics of height, size, distance from the service aisle, row spacing, and gaps.

Another object of this invention is to provide a simplified grove spray machine having the ability to quietly and gently place chemical spray on and in grove trees, new growth, fruit, bloom, and other tender elements without agitation or allied disturbance.

Another object of this invention is to provide a grove spray machine that is simple and uncomplicated, low cost, light weight, economical to operate, easily and cheaply maintained, and easily transported.

Another object of this invention is to provide an agricultural grove sprayer which complements the natural configuration of the tree elements and their interstices by allowing a natural, unassisted flow of a spray mist generated therein.

Another object of this invention is to provide an agricultural grove sprayer embodying a means of directing a spray nozzle within the foliage of a grove tree such that the upper spray mist generated therein may be directed downward into the upper foliage of the tree, while the lower generated sprays may be directed upward into the lower tree surfaces.

SUMMARY OF THE INVENTION

The present machine is different both in structure and method of operation from the prior art discussed above. It provides a means of positioning spray nozzles in passing tree foliage such that spray is generated only when the spray nozzles are situated within the passing tree itself. A corresponding, novel method for positioning spray nozzles for external economical, tree foliage spraying is also revealed.

Briefly described, the present invention, which is believed to obviate the problems described heretofore, constitutes a grove spraying device mounted on a moving base and comprising a spray liquid tank, a pump, and at least one hollow support mast for laterally positioned and flexibly mounted, nozzle supporting boom arms, and whereby all described elements are operatively connected for valve actuation by boom arm deflection as it contacts the passing tree foliage and positions the nozzles therein. Thereby, chemical spray is directed from the tank, through the pump, into the mast, thence into the spray arms and out the nozzles to generate and introduce spray mist into the contacted foliage only when the boom nozzles are positioned on or inside the tree foliage. Spray generation ceases when the boom arm returns, and the liquid flow valve is closed. Thus, no external spray generation occurs in the outer atmosphere.

Three variations of this spray machine are herein disclosed along with the operating conditions for which each was developed. The common characteristic of these three variations is the use of the above described vertically spaced, horizontal, nozzle-bearing boom arms and their method of functioning whereby they collaterally contour the aisle periphery surface of each passing tree by spray nozzle profiling contact. Thus, the spray machine described herein may be referred to henceforth variously as a "profile spray machine", or a "profile sprayer", or a "profiler". Thus:

Profiler Sprayer Type I is designed to be most efficiently used in fruit groves having irregular tree sizes, widths, and heights, irregular tree spacing, damaged trees, young trees, widely spaced trees or foliage, or wide aisles. Each spray nozzle is independently valved.

Each profiler is equipped with individual, spring-return, valve-nozzle combinations, individually paired or unitized, and mounted in the leading edge of a boom arm, one end of which is attached flexibly to a vertical support such that it is deflected rearward and in a longitudinal manner slides in or along the foliage as the vehicle proceeds along the tree rows. The valves are of the wand operated type having a control handle which is itself a wand or lever which the boom arm forces into contact with the passing foliage and which, when thus deflected by foliage contact, opens the valve and initiates the flow of spray solution to the spray nozzled it controls. As the spring-return wand leaves the retaining pressure of the foliage, it is spring-returned to the closed valve position and thus halting the spray fluid flow to that specific spray nozzle.

Profile Sprayer II is expected to be most effectively used in either hedged or nonhedged fruit groves of medium to large acreages of older fruit trees having a majority of consistent tree and foliage growth.

Each boom arm is independently valved and all spray nozzles on that boom function simultaneously on and off. In this variation all the boom-mounted nozzles are open directly to the liquid contained therein, and the liquid flow into the boom is controlled by a valve mounted on the vertical support at the point of flexing between the vertical support and the boom arm such that as that arm is deflected by the passing foliage it opens the valve thus initiating the spray flow and the spray generation simultaneously at all nozzles mounted on that arm. As the arm leaves the foliage it is spring returned to the closed valve position thus halting the spray flow at the vertical supply pipes prior to entering the boom and thus terminating the spray generation at each nozzle simultaneously.

Profile Sprayer III is expected to be used most effectively for groves of large acreages of mature fruit trees which may be hedged or nonhedged and having consistent foliage.

No valving exists between the pump and the nozzles, thus all nozzles on this profiler are activated simultaneously when pump fluid pressure is initiated.

In this variation, as in type II, all the boom mounted nozzles are open directly to the liquid contained within the boom arms, however, this is not meant to limit the use of any optional spray or control circuits.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
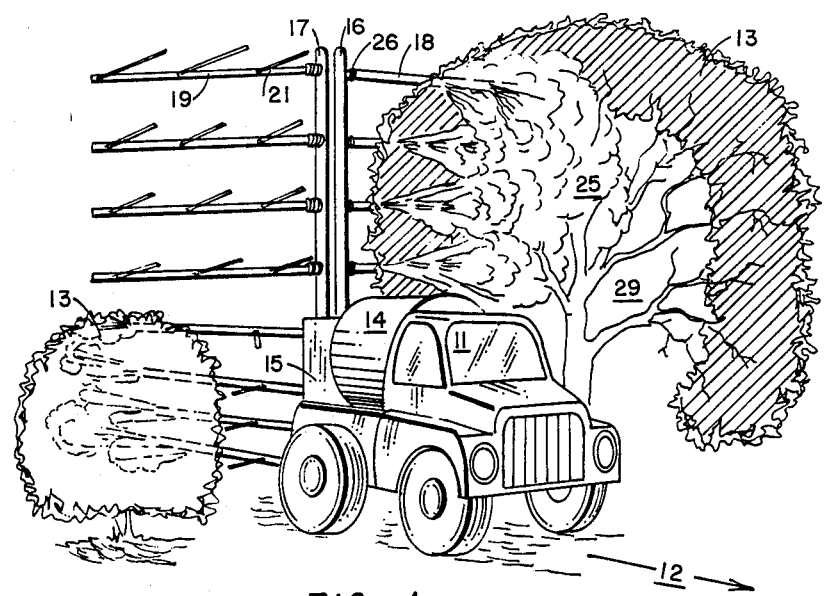
FIG. 1 is a front, perspective view of an operating, profile sprayer in which all spray nozzle valves operate the spray nozzles by individual, valve handle wand, foliage deflection as shown by its operational relationship to two different size trees and to a mature tree shown in generalized section.

Referring to the drawings and especially to FIG. 1, a moving vehicle 11, which in the present case is motorized, multi-wheeled vehicle, is loaded with a grove sprayer apparatus which shall be herein described and which is so constructed as to be operable as vehicle proceeds along aisle 12, as directionally shown in a vehicle serviceway between the rows of fruit trees or foliage 13 borders thereat. A liquid chemical tank 14 is mounted on vehicle 11 and has a conventional liquid pump 15 attached thereto. Upwardly extending masts 16 and 17 are mounted respectively on the left and on the right side of vehicle 11 and are connected to the pump 15 and through pump 15 to the chemical tank 14. The pump 15 can thereby pump liquid chemicals (27, FIG. 2) from the tank 14 through the hollow masts 16 and 17. The hollow masts 16 and 17 each have a plurality of arms, or booms 18, extending outward laterally in a generally perpendicular manner from the masts 16 and 17. Each of the booms 18 may be a hollow tube attached at its base to each of the masts 16 and 17 with a compatible spring 26, or a set or plurality of springs as detailed in FIG. 7 which result in the same desirable compatibility as spring 26, and which supports said boom 18 and also allows it to be swung universally by tree foliage 13 pressure about the spring axis, and to return the boom 18 to its normal lateral, resting position when the tree foliage 13 pressure is released. Each boom 18 may have a plurality of nozzles 21 mounted in the leading edge such that as vehicle 11 moves past the grove trees 13 the boom 18 contacts the grove tree foliage 13 which deflects the boom 18 at spring 26 to a trailing position such that the pressure of the spring 26 holds the leading edge of boom 18 onto or into the tree foliage and without shaking or agitating said foliage. Each foliage contacting portion of boom 18 slides smoothly through the contacted foliage 13 and thus positions and holds the spray nozzles 21 onto, and thus into, the tree foliage 13 and thereby to allow spray mist 25 to be generated in, and thus discharged only into, tree foliage 13 and thence forward into tree interior cavity 29.

As the spray machine proceeds along the service aisle, each passing tree is fully contacted by boom positioned nozzles for its full height and profile on the aisle, thus, this spray machine may herein be referred to variously as a "profile spray machine", a "profile sprayer", or a "profiler".

Figure 2:
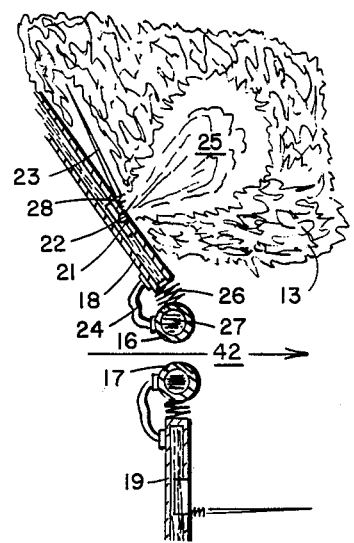
FIG. 2 is a sectional view of the profile sprayer system of FIG. 1 taken horizontally through the masts and illustrating the flexible arm supports and the wand and nozzle valving system.

Three types of this profile spray machine are disclosed herein as follows:

Profile Sprayer Type I Referring again to FIG. 1 in generality but to FIG. 2 more specifically, the moving vehicle again progresses down the aisle as directionally shown by arrow 42 and as previously described with pump 15 forcing a spray fluid 27 from storage tank 14 into vertical support pipes 16 and 17, thenceforth into flexible hose 24, and into pipe boom 18 where it is again stored until such time as manual or solenoid valve 22 opens and releases it into spray nozzle 21 for spray mist 25 generation. Spray nozzle 21 and its valve 22 are shown as a valve-nozzle unit, however, they may herein be paired individually if so optioned. Each boom arm 18 of FIG. 1 is shown herein optionally with 3 spray nozzles 21, and each spray nozzle 21 is specifically controlled by its own individual valve 22 located immediately adjacent for positive and immediate control. Each valve 22 is of a conventional, spring loaded, or spring return, type having for a handle a wand 23 which is mounted to operate through the leading edge of boom 18 with the valve wand 23 pointing forward such that as the leading edge of boom 18 slides through the tree foliage 13, valve wand handle 23 is deflected and thus activates that specific spray nozzle 22 which it controls and with which it is shown here as comprising a unit, and which is itself thusly positioned in said foliage 13. It will be noted herein that a security spring 28 is interposed as a safeguard feature, and as such, it is mounted lengthwise between wand 23 and valve 22, and said spring is of such resistance that when wand 23 is deflected by contact with foliage 13 then valve 22 is activated as heretofore described, however, when valve 22 has been activated fully to its operating limit, then spring 28 will flex and allow wand 23 to be deflected further and even down against its supporting boom arm 18 such that no injurious stresses are produced on either valve 22 or wand 23.

Figure 9:
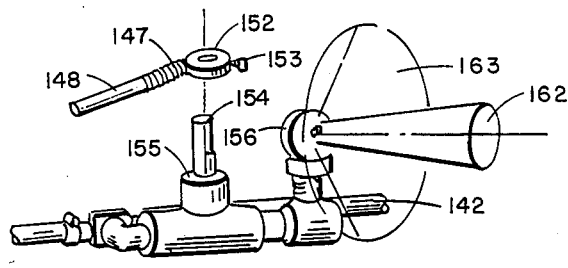
FIG. 9 is a partial perspective view of a spray nozzle and valve.

Hereat may be detailed the complete wand-to-valve structure as noted in FIG. 9 such that wand 148 is affixed to safety spring 147, which in turn is affixed to valve 155 by fitting 152 being place over valve stem 154 and being secured thereon by set screw 153, however, this shows but one of the various utilizable valve types and wand adaptations thereto.

Figure 7:
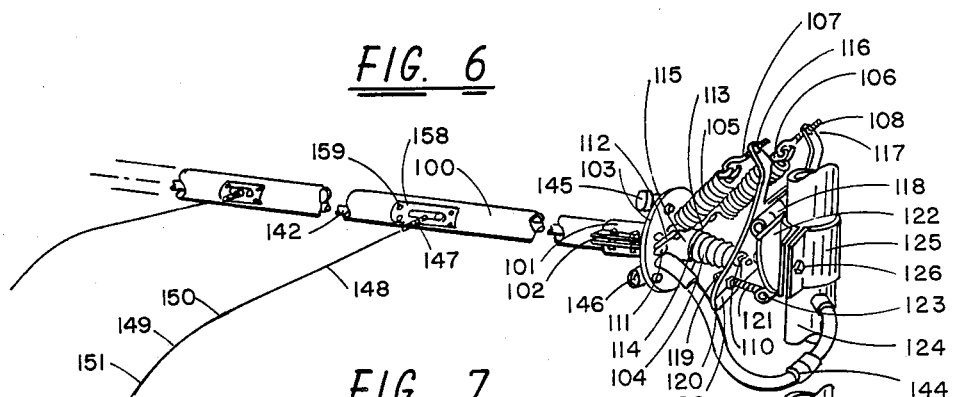
FIG. 7 is a partial perspective view of a complete, profile sprayer boom arm unit with its internal components, boom mast, and spring flexing mechanism, boom horizontal, vertical, and rotational adjustments, and the external valve wand activator detail.
Figure 10:
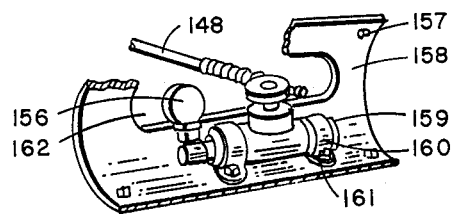
FIG. 10 is a partial perspective view or alternate embodiment of a spray nozzle and valve in a boom mounting plate.

FIG. 10 details the manner in which nozzle valve 155 is secured to mounting plate 158 by fittings 160 which are secured in turn to plate 158 by bolts 161 such that spray nozzle 156 and valve wand 148, along with said pertinent accessory elements, fit operationally through plate slot 162, and as noted in FIG. 7, plate 158 is secured to boom arm 100 by boom implanted bolts 159 through plate bolt holes 157.

FIG. 7 details eye protectors 149 of pliable strand lengths so butt welded or otherwise affixed to the end of wand 148 at point 150 in such manner that the diameter of the affixing method does not exceed the diameter of wand 148, and thereby the complete wand tip safety unit slips in a clean and unimpeded manner through close foliage or binding tree structure. Further, the tip of said eye protector 149 is safely blunted or rounded off by a welding bead 151 or other means such that no metal fibers or other sharp terminating structure is exposed.

In FIG. 2, the opening of nozzle control valve 22 allows the fluid 27 stored in boom 18 to be forced through it into spray nozzle 21 and is expelled therefrom as a vectored mist 25 having an inherent forward velocity such that no additional forces other than its own resultant generation velocity is sufficient of itself to proceed through and to coat the thickness of said canopy foliage 13, and to travel thence into said interior tree foliage canopy cavity 29, which thusly is formed inside said foliage overgrowth shell such that further inner growth ceases where further sunlight is cut off, and thus said shell forms a hollow interior containing only bare tree supporting structure which is accessible openly to maximum exposure time to said entrapped spray mist deposition thereon as it circulates therein.

When said generation of spray mist 25 is activated it will continue to be so generated and released within said tree foliage 13 and into said inner foliage canopy cavity 29 so long as wand, valve handle 23 remains held in the deflected, valve open position by said passing tree foliage 13. The spray action continues with farther forward progress of the sprayer 11 until such time as that portion of the boom arm 18 on which is mounted this specific valve wand 23 passes out from the foliage 13 thus releasing the foliage 13 activating pressure from the wand 23 and allowing the valve spring return mechanism to return the wand valve handle 23 to its off position. This stops fluid 27 flow to spray head 21 which immediately ceases said spray mist 25 generation as spray nozzle 21 leaves tree foliage 13, thus said spray mist 25 generation ceases before spray mist can be generated outside the tree as waste, or as pollution in and into the atmosphere.

As noted in FIG. 1, said foliage 13 forms a permeable hemispheric canopy over and about the tree such that a chamber 59 is formed within it which holds and accumulates therein the vectored spray mist generated therewith and whose residual generating forward energy circulates it freely through the inner tree structure within said chamber. Thusly, it coats all the exposed surfaces of the tree supporting structure, the inner crop, and both the upper and lower leaf surfaces. Because the foliage 13 canopy protects the spray mist from dissipation and dilution by external wind and weather conditions, and because it retains and retards the escape of the chemicals contained therein, said chemicals are deposited continually as the spray mist solution carrying them filters through the foliage canopy interstices, and only relatively dry, filtered air escapes into the outer atmosphere.

It is to be understood that there are many diverse spray patterns generated by many types of common, commercially available spray heads to satisfy the diverse needs of the spray industries. Two relevant spray patterns are shown in FIG. 9 whereby spray nozzle 156 may be of such type to produce a narrow, concentrated, and forceful jet of spray mist as noted by representation 162 such as has been herein advocated for deep foliage and foliage cavity penetration. Said nozzle 156 may be of the type such as to produce a relatively short but widely disseminated spray pattern 163 whereby the upper portion of the spray pattern sprays upwardly into the bottom surfaces of the foliage above it, while the bottom portion of the pattern sprays downwardly into the upper foliage surfaces below. Thus the utilization of nozzles generating a surfacely shallow spray mist produces yet another profile sprayer method of spraying the outer canopy foliage region. It may be seen further that said nozzles of many spray patterns may be used exclusively all for deep penetration or all for shallow penetration, or they may be so interspersed as to form as many patterns as found necessary to cope with the existing grove conditions.

Another and direct method of profile spraying the external surface of the tree is noted in FIG. 7 whereby spray nozzles 145 and 146 are mounted on any selected portion of boom arm 100 that during operation remains outside the peripheral area of external foliage contact. Its control valving may be that of any of the methods revealed heretofore, and it may be separate from or in conjunction with any other spray action heretofore revealed. Thus is provided a mounting of constant maximum distance between the spray nozzle and the external foliage periphery of each tree such that the tree nozzle-foliage distance never exceeds operationally the nozzle-valve distance from the position at which the said trigger valve is located, as the profile sprayer proceeds through the entire grove area. Therefore, said nozzle-foliage distance remains operationally, maximally constant throughout the entire multiplicity of boom arms. Now all the critical requirements of nozzle pressure, nozzles characteristics, distances to foliage, forward velocity, vehicle aisle speed, and other auxiliary variable are in direct, positive control regardless of the tree size or distance back from the service aisle, and as compared to said standard spraying practice of generating and blasting a blanket chemical spray mist at large from a spray machine situated apart in the service aisle in existing atmospheric conditions.

Since all functional apparatus carried by the boom is fitted smoothly to or within the boom contours, the boom passes smoothly and easily through the tree foliage such as not to shake or otherwise disturb the foliage or the limbs or any other tree structural members and thereby not causing the accidental operational removing, scarring, or disturbing of any new growth or fruit or bloom the tree may bear at the occasion of the spraying. Also, since the spring flexing mechanism by which the boom is supported allows free universal boom movement about its point of support, the boom is allowed not only to float freely through the foliage, but it will similarly over or around any hedged or severed tree limb stumps or any of the other impediments usually expected or encountered or otherwise experienced within or in the vicinity of the foliage itself.

Figure 3:
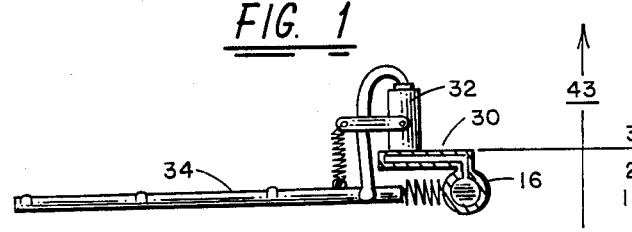
FIG. 3 is a top plan view of the valving and boom spraying assembly of a second type profile sprayer in which a deflecting boom arm controls a single valve which simultaneously activates all nozzles mounted on that specific boom arm.

Profile Sprayer Type II The embodiment of this variation is shown in FIG. 3 in which all heretofore profile sprayer type 1 conditions of fluid 27 flow into the vertical support and liquid supply pipes 16 and 17 remain the same and herein flow farther into valve feed pipes 30 and 31 on which are mounted spring-loaded or spring-return spray fluid valves 32 and 33 respectively and at which point the fluid is stopped until such time as either or both said valves 32 or 33 are opened. FIG. 3 is a comparative drawing in which boom 34 is shown free of foliage and thus in it nondeflected position such that its controlled valve 32 remains in closed position, whereas boom arm 35 is shown deflected rearward to the direction of travel 43 by tree foliage 36 which is shown here as a hedgerow and thus tensioning spring 37 sufficiently to pull and hold spring loaded valve handle 38 to its on-position, or flow activating position, and from which farther deflection of boom arm 35 causes an elongation of spring 37 and thus effectively counteracting any damaging effect of farther tension. With valve handle 38 thus activating valve 33, the spray fluid 27 is forced to flow from its holding position in pipe 31 into and through valve 33, and therefrom into flexible hose 40, and thence into hollow spray boom arm 35 in which one or more spray nozzles 41 are inserted in through the wall of the leading edge in an unrestricted manner such that a spray mist 25 is generated simultaneously at all nozzles mounted on that boom arm and within and into the tree foliage and the foliage canopy cavity at any such time as a pressurized fluid is introduced into the hollow boom arm. As the profile sprayer proceeds forward and the boom arm 35 passes from the foliage 36 restraining force, the flexible support spring 39 returns it forward to its lateral position, thus releasing the tension on spring 37 and allowing spring loaded valve 33 to return to its valve-off, or closed, position, and thereby halting the fluid 27 flow to all nozzles 41 on that boom and terminating the spray generation of all nozzles simultaneously. Thus, profiler type II also generates spray mist only in or inside the immediate area of utilization but with such being accomplished most economically over generally larger and more uniform acreages while mechanically utilizing fewer valving and plumbing components with less allied manufacturing expense and maintenance.

Figure 4:
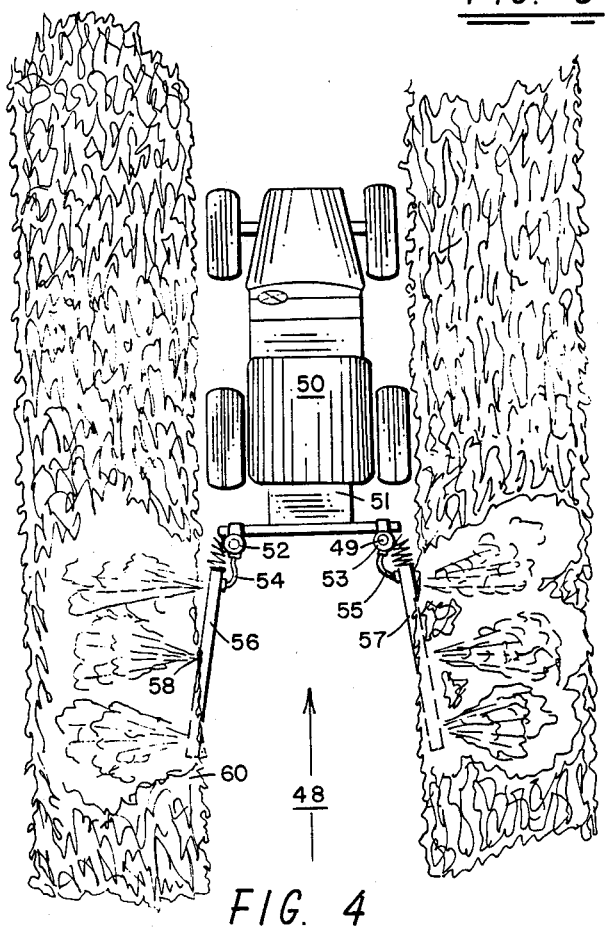
FIG. 4 is a top plan view of a third type of profile sprayer in which no pump-nozzle valving exists, and all incorporated spray nozzles are free flowing.
Figure 5:
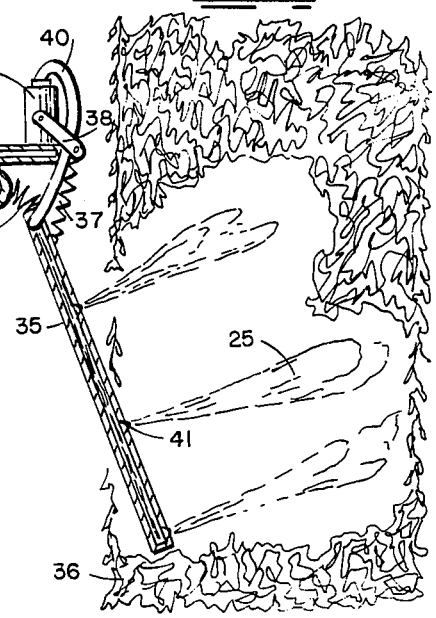
FIG. 5 is a top, horizontal sectional view taken through one operational spray arm of the profile sprayer shown in FIG. 4.

Profile Sprayer Type III In this variation all the previously described mechanical characteristics common to the profile sprayer exist herein such that as the profiler proceeds as directionally shown along the aisles 48 of FIG. 4, and as noted therein hereafter, the boom arms 56 and 57 flex rearward and slip easily along the outer tree foliage 60, which is shown here as a hedgerow, however, no valve controls exist in the fluid 49 flow circuit from the pump 51 to the boom arm nozzles 58. Thus, to begin a spray run the operator starts the pump as he begins and proceeds down the aisle 48 as again shown in FIG. 4 and FIG. 5 and with an unimpeded flow of spray fluid 49 from tank 50, through pump 51, and into hollow masts 52 and 53, and thence through flexible tubing 54 and 55 respectively, and into hollow boom arms 56 and 57 respectively, thence through nozzles 58, and being thereat generated into spray mist 59 in foliage 60. Said spray action continues until termination of the pump action at the operator's option, and thus the spray mist generation at all spray nozzles of the machine begin and cease operation simultaneously, however, this is not meant to preclude separately controlled circuits for either side or other such options.

Since this profiler variation uses a pure unimpeded and non-valved pump-to-nozzle flow, it incorporates only the simplest plumbing components and embodies the lowest manufacturing cost and operating expense in addition to trouble free operation and ease of modification for any regional conditions or specifications. Its greatest operating economy is obtained over large acreages of generally uniform trees of consistent foliage characteristics. This also favors uniform coverage and spraying seed.

The profiler components are full adjustable to compensate for all physical tree and grove characteristics and limitations, and to facilitate such disclosure, FIG. 6 gives a generalized, informational, perspective rear view of a vehicle-mounted profile sprayer showing the mast structure and the adjustments for tree heights and the aisle distances prevalent between the foliages bordering the tree rows, and it also shows the erection and folding features useful for grove operational use and for folding for highway transport. Du to differing conditions such as grove age, tree grid spacings, hedging practices, etc., different groves may have different aisle widths between adjacent tree row foliages, and thusly, at the start of said spray run, said spray row width is effectively compensated for by extending or retracting mast mounting fittings 75 and 76 on horizontal pipe support 72. Thus, upright support structure 70 is erected centrally at the rear such that horizontal pipe cross member 72 may be so affixed as to accommodate masts 73 and 74 mounted in slip fittings 75 and 76 respectively, which allow rotating motion of said masts therein but having top retaining rings 77 and 78 respectively and bottom retaining rings 79 and 80 respectively which prevent any longitudinal movement in said fittings 75 and 76. Fittings 75 and 76 are so constructed as to slip freely longitudinally inwardly and outwardly on cross member 72 while carrying masts 73 and 74 respectively and which may be raised and secured upright at any of the predetermined width adjustment hole or slot settings 93 of said cross member 72 by attaching winch 88 lifting cable 85 snap fastener 86 to ring 87 secured to the bottom of mast 74 such that the utilization of winch 88 will tension cable 85 through guide and chafing pulley 89 and thereby raising mast 74 upright. Said mast 74 may then be locked in upright position by removing pin 82 from slip fitting 84 and then raising it sufficiently that, when mast 74 is pulled against bumper strip 91, then slip fitting 84 may be dropped down such that flanged edge 90 catches behind said bumper strip such that pin 82 may then be replaced through slip fitting 84 and securing it in place. This locks mast 74 securely in place as noted in the securing of mast 73 in its vertical position by slip fitting 83 thereon and which similarly is secured over bumper 91 and retained in position by locking pin 81.

For highway transport the masts 73 and 74 may be rotated forward around their horizontal, pipe cross support member 72 and thereby to rest on chair 92 in horizontal position as indicated by mast 74. Said masts may be secured in horizontal position as detailed for mast 74 by inserting pin 94 through fitting 76 and through indicated passageway 98 in horizontal support pipe 72. Said masts may be secured in vertical position by inserting pin 94 through fitting 76 and one of the appropriate positions 93 in support pipe 72.

On occasion when groves of taller trees may be encountered then a similar tier of profile sprayer masts and appurtenances FIG. 6, 97 may be added above the first by being mounted to second upright support structure 71 as noted such that it is situated upon and slightly behind upright support structure 70 such as to be sufficiently clear of the masts 73 and 74 and the optional spaces of the mechanisms thereon as is further noted in FIG. 6 whereby upper profile support structure 71 is secured buy bolts 96 to spacer 95 which in turn is secured similarly to support structure 70. Said additionally mounted structure 97 and its support structure 71 may be designed as a compact standby unit for quick coupling conversion.

FIG. 7 illustrates a complete flexing boom arm unit and details the manner in which said boom arm is mounted and variously adjusted to cope operationally with the tree and foliage conditions and differences normally encountered in a given grove tract. Although three variations of the profile spray machine are herein disclosed, one of the common features of each is the nozzle-bearing boom arm, and although the boom arm illustrated in FIG. 7 is that of variation type I, all the adjustment features described are common to all, and it is to be understood further that wherever a single support spring is revealed, then any combination of springs such as illustrated in FIG. 7, and which results in an adaptable flexing and supporting action, is equally acceptable. Thus, in the complete boom arm unit as detailed in FIG. 7 the nozzle boom arm 100 is secured at its base in the split socket fitting 101 and secured therein by bolts 102 such that said nozzle boom arm may be removed, or such that it may be rotationally adjusted optionally about its longitudinal axis such as to depress the spray generation angle of the upper boom arms downward into the upper tree foliage and to elevate the spray generation angle of the lower booms upwardly and more directly into the lower foliage. Split socket 101 is affixed to plate 103 which is itself supported by main support spring 104 which is attached at securing fitting 115, and the other end of which is mounted to base plate 109 by bolt 110. Two helper springs 105 and 106 are mounted on either side of main support spring 104 to help damp residual rebound motion and to adjust said boom-foliage pressure. Springs 105 and 106 are attached at their upper end to base plate 109 by adjustable length eye bolts 107 and 108 respectively such as to adjust tensioning by nuts 116 and 117 respectively for any changes in the boom weight, boom-foliage pressure, boom return speed, boom vertical angle, or other operating characteristics of said boom arm 100. Said helper springs 105 and 106 are attached to loose links 112 and 113 respectively and thereby to plate 103 at fixtures 111 and 114 respectively, and it is the function of said loose links 112 and 113 to provide not only spring tension linkage but also to provide slack in said alternating swings whereby that end of springs 105 and 106 may drop down and avoid any blocking action tending to restrict any reactive swing of boom arm 100. Base plate 109 is supported in a vertically adjustable manner at hinge pin 118 such to facilitate any vertical setting necessary for said complete boom arm unit, and such is contrived by the adjustment of nuts 119 and 120 on bottom support bolt 121 which is to swing freely on lower hinge 123 to adapt to said adjustment. Plate 122 is secured to mast 124 by U-clamp 125 and a bolt pair 126 having one bolt mounted on either side such to adjust the horizontal, lateral angle index point of the complete boom arm unit around mast 124 to secure the most efficient foliage contact, also to raise and lower the boom arm height position on said mast, further to adjust the vertical distances between the boom arm units to facilitate changing vertical boom clearance spacings, to adjust the vertical spray emission spacings in the grove tree foliage, and also to provide a manner of quick removal of said boom arm unit for repair or replacement.

Figure 6:
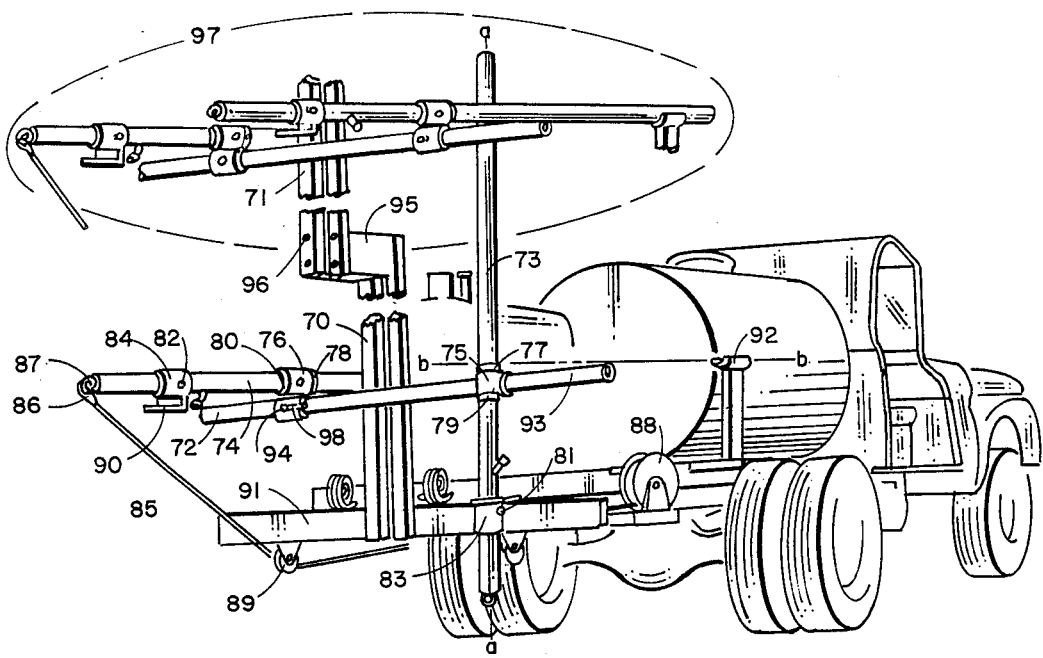
FIG. 6 is a perspective rear view of a profile spray machine showing the mast structure and the additions for supplementary height structure, the adjustments for aisle width between row foliage, and the erection features for grove operational use and for folding for highway transport.
Figure 8:
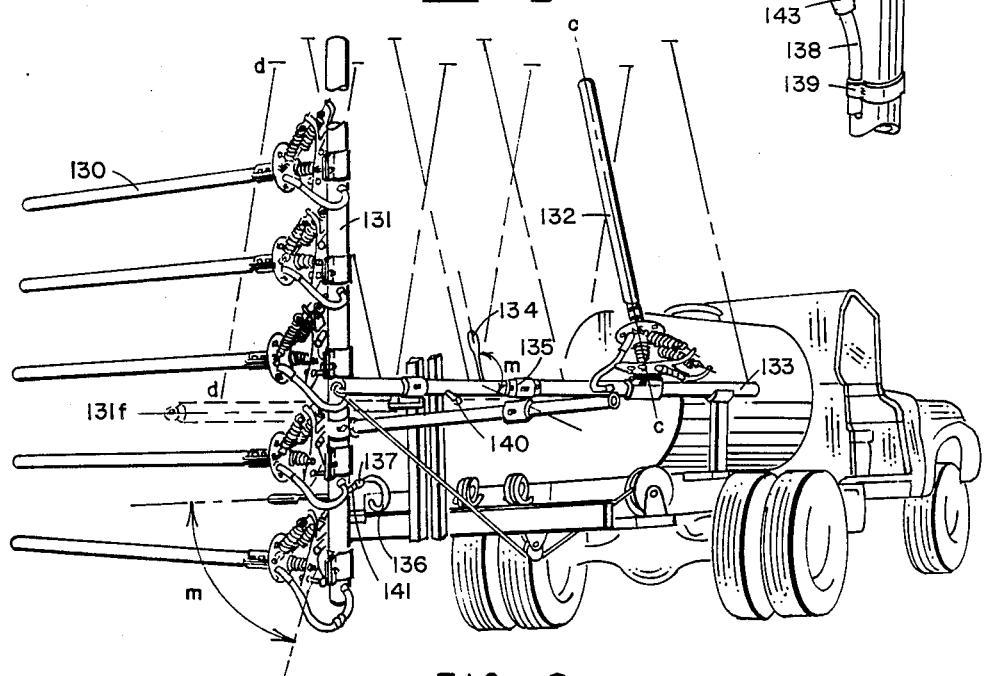
FIG. 8 is a rear perspective view of the spray machine showing the manner of the mounting and placement of the boom arm units for both grove operation and highway transport and showing the spray fluid hoses and connections.

FIG. 8 illustrates the manner in which the boom arms 130 are mounted on a raised mast 131 for operation in a grove, and it also illustrates the manner in which a boom arm 132 is positioned on a folded mast for highway transportation. When the profiler arrives at the grove spray site the masts and all the boom arms are in the folded position of mast 133 and boom arm 132, as indicated by center line c–c' and its parallel center lines as detailed and as equally noted for folded mast 131 center line position 131f and its booms d-d and it's parallel boom arm center lines. To convert the profiler into its operational mode, lever 134 is swung through arc "m" as necessary and thus rotating mast 133 in supporting collar 135 such that boom arm 132 is rotated to its outward position such that when mast 133 is raised and locked in its vertical position as has been described heretofore in FIG. 6 summary, and as noted herewith in FIG. 8 for mast 131, then its structure is operationally correct to begin spraying.

In the three systems of spray fluid flow and control heretofore noted and described a hollow boom and mast have formed the basic passage for fluid flow from pump to spray nozzles. Other methods of piping the fluid may offer greater diversity and efficiency as occasioned. Thus, the spray fluid flow to hollow mast 131 is interrupted by self-coiling hose 136 positioned near its point of utility such that in erecting or folding said mast the hose may be quickly attached or detached by the use of quick couplers at pre-equipped positions such as 140 and 141. As noted in FIG. 7, fluid supply hoses may be run internally or externally in or on any supporting structure as noted by hose 138 which is attached to mast 124 by clamps 139 and boom nozzle supply hose 142 which is run internally, and each is appropriately equipped with quick coupling features at 143 and 144 respectively, however, these features are illustrative and in no way to be restrictive of hosing, hardware, or manner of use.

Another method of eternal spray coverage is noted in FIG. 7 whereby spray nozzles 145 and 146 are mounted on that part of profile sprayer boom arm 100 structure operating outside the tree foliage perimeter such that said nozzles may be directed treeward whereby the externally generated spray mist coats the external foliage surface. Additionally, when said external spray nozzle mounting is on a portion of the deflecting boom arm 100 as shown, then the external action is coordinated and directed in unison with the external surface of the same foliage segment the internal spray nozzle action is covering therein.

Figure 11:
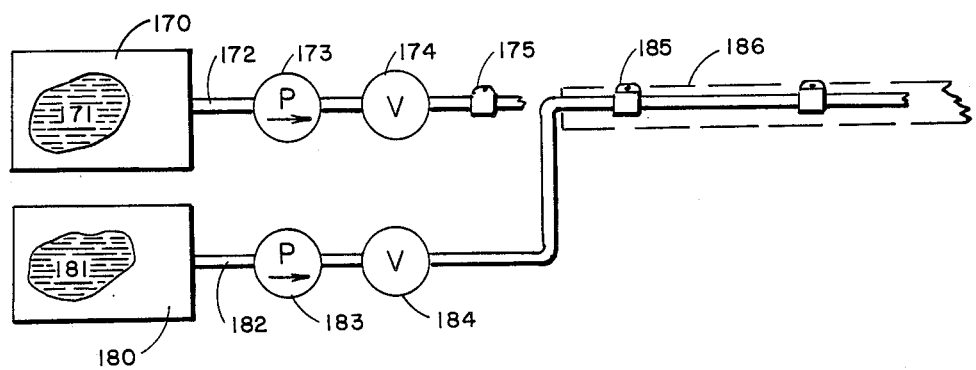
FIG. 11 is a schematic diagram showing the method whereby two independent spray systems are utilized on one vehicle.

The hoses feeding the spray liquid to the external spray nozzles may be coupled directly to the hoses feeding spray fluid to said nozzles generating the internal spray mist, or they may be fed from an entirely different source, as shown in FIG. 11, and thus they may be fed an entirely different spray chemical or solution. FIG. 11 shows in detail the method of spraying using two independent spray systems mounted on the same vehicle whereby each independent spray system incorporates its own nozzle circuit, and each system utilizes a specific chemical spray liquid. Thus, spray liquid tank 170 contains specific spray liquid 171 which is pumped from tank 170 by pump 173 through conduit 172 to and through manual or solenoid valve 174 and thence to spray nozzle 175 and other nozzles as may be incorporated in this circuit. Spray liquid tank 180 contains specific spray liquid 181 which is pumped from tank 180 by pump 183 through conduit 182 to and through manual or solenoid valve 184 and thence to spray nozzle 185 and other nozzles as may be incorporated in this circuit in the boom arm 186. It will be noted that this stated choice of spray fluid source would allow the internal and external spray actions to be simultaneous or individual such that an entire grove of fruit trees may all be sprayed (1) internally only, (2) externally only, or (3) may be sprayed simultaneously with the same or different spray solutions internally and externally, and each spray action aforementioned may be individually valved or continuous.

I claim:

1. A grove sprayer comprising:
   a wheeled vehicle having a chemical tank mounted thereto and a pump mounted thereon and operatively connected to the chemical tank;
   at least one upwardly extending hollow mast attached to said vehicle and being operatively connected through said pump to said chemical tank;
   a plurality of boom arm assemblies each having a boom arm extending generally laterally from said mast, said boom arms being flexibly attached to the mast, whereby they extend outwardly so as to contact and slip longitudinally through foliage of a grove as the sprayer passes therethrough;
   return means for returning said boom arms deflected by tree foliage in a grove, once the boom arm passes the tree foliage, said return means including a boom mounting plate, a boom return spring and a spring attaching means connected to each boom for attaching said boom return spring to said boom;
   spray nozzles mounted to each said boom arm assembly, each said spray nozzle being mounted to reduce agitation to the tree foliage; and
   a flexible conduit connected from said mast to said boom arm whereby chemicals are supplied through said boom arms to said spray nozzles from said mast.

2. A grove sprayer in accordance with claim 1 in which each said spray nozzle is connected to a spring return control valve having an actuating wand extending therefrom for activating said control valve responsive to said wand contacting grove tree foliage and deflecting the wand to the valve-on position whereby chemical spray is directed out said spray nozzle to spray said grove tree foliage only when each said spray nozzle is positioned in said grove tree foliage, and said spray nozzle generation continues until the valve wand passes from said tree foliage allowing the spring return control valve wand to return to its normal valve-off position to terminate said spray nozzle generation.

3. A grove sprayer in accordance with claim 1 in which each said boom arm has a valve operatively connected thereto for actuation of said nozzles mounted on said boom arm by said boom arm contacting said foliage on said grove tree whereby chemicals are directed from said upwardly extending mast, through said valve, and through said boom arm and out said nozzles to spray said grove foliage only when said boom arm is positioned in said tree foliage.

4. A grove sprayer in accordance with claim 2 in which each said valve is a solenoid operated valve.

5. A grove sprayer in accordance with claim 3 in which each said valve is a solenoid operated valve.

6. A grove sprayer in accordance with claim 1 in which at least one spray nozzle is mounted on at least one said boom arm outside of the normal tree foliage periphery whereby said spray nozzle is directed treeward, so that spray mist coats the external foliage surface.

7. A grove sprayer in accordance with claim 2 in which at least one spray nozzle is mounted on said boom arm to operate outside the normal tree foliage periphery so that said spray nozzle is directed toward the tree foliage to generate spray mist to coat the external foliage surface.

8. A grove sprayer in accordance with claim 3 in which at least one spray nozzle is mounted on said boom arm outside the normal tree foliage periphery so that said spray nozzle is directed toward the tree foliage to generate spray mist to coat the external foliage surface.

9. A grove sprayer in accordance with claim 7 including means for simultaneously spraying the internal and external portions of the grove tree, said means having said spring return control valve adapted to actuate said spray nozzle mounted on said boom arm to operate outside the normal tree foliage periphery.

10. A grove sprayer in accordance with claim 8 including means for simultaneously spraying the internal and external portions of the grove tree, said means having said spring return control valve adapted to actuate said spray nozzle mounted on said boom arm to operate outside the normal tree foliage periphery

11. A grove sprayer in accordance with claim 9 in which said vehicle has a pair of chemical tanks mounted thereto and a pair of pumps mounted thereon and each chemical tank is operatively connected to one pump and each pump is operatively connected to separate boom nozzles whereby different chemicals can be sprayed through different nozzles.

12. A grove sprayer in accordance with claim 10 in which said vehicle has a pair of chemical tanks mounted thereto and a pair of pumps mounted thereon and each chemical tank is operatively connected to separate boom nozzles whereby different chemicals can be sprayed through different nozzles.

13. A grove sprayer in accordance with claim 11 in which said means for simultaneously spraying the internal and external portions of a grove tree includes having one chemical tank and one pump operatively connected to a spray nozzle operating outside the normal tree foliage periphery for spraying tree foliage and said second chemical tank and pump are connected to spray nozzles mounted on said boom arm to operate inside the normal tree foliage periphery.

14. A grove sprayer in accordance with claim 12 in which said means for simultaneously spraying the internal and external portions of a grove tree includes having one chemical tank and one pump operatively connected to a spray nozzle operating outside the normal tree foliage periphery for spraying tree foliage and said second chemical tank and pump are connected to spray nozzles mounted on said boom arm to operate inside the normal tree foliage periphery.

15. A grove sprayer in accordance with claim 1 including a boom arm flexible mounting means for allowing a swinging movement of said boom arm in a plurality of directions whereby pressure on said boom arm may be relieved by the movement of said boom arm.

16. A grove sprayer in accordance with claim 1 in which at least one said spray nozzle is a wide angle spray generating nozzle for providing a point source for shallow depth spray mist coverage of the foliage being sprayed.

17. A grove sprayer in accordance with claim 1 in which at least one directional spray generating nozzle is mounted in at least one boom to provide a point source for deeper spray penetration of the interior tree foliage.

18. A grove sprayer in accordance with claim 15 in which said boom arm flexible support means includes flexible springs which allow said boom arm to return following movement of said arm relative to said mast.

19. A rove sprayer in accordance with claim 1 including a mounting adjustment means for adjustably positioning the vertical angle of said boom arm.

20. A grove sprayer in accordance with claim 1 including a boom arm mounting means for rotatably mounting said boom to said mast whereby the vertical angle of said nozzles on said boom may be changed.

21. A grove sprayer in accordance with claim 1 including a boom arm mounting means for adjustably mounting said boom arms to said mast whereby the vertical position of said boom arm on said mast can be changed.

22. A grove sprayer in accordance with claim 1 including a boom arm mounting means for horizontally adjusting the position of said laterally extending boom arm whereby boom arm foliage contact may be selected for different width rows in a grove.

23. A grove sprayer in accordance with claim 3 having a plurality of spray nozzles mounted on said boom arm assembly to operate outside the normal tree foliage periphery so that such spray nozzle is directed towards the tree foliage to generate spray mist to coat the exterior foliage surface.

24. A grove sprayer in accordance with claim 7 having a valve actuating means of a predetermined length whereby each said boom arm spray nozzle is actuated at a predetermined distance from said tree foliage.

25. A grove sprayer in accordance with claim 1 in which said plurality of boom arms have an operative position and a folded position and said mast has an operative position and a folded position relative to said wheeled vehicle whereby said boom arms and mast can be folded onto said wheeled vehicle for transport between groves.

26. A grove sprayer in accordance with claim 1 in which said wheeled vehicle has a pair of upwardly extending masts laterally adjustable on said wheeled vehicle whereby the mast and booms are adjusted relative to the row width of foliage trees in a grove.

27. A grove sprayer in accordance with claim 1 having a superstructure means attached to the upper portion of each upwardly extending mast and said superstructure means having at least one boom arm attached thereto whereby said mast and boom arm have an extension added thereto.

28. A grove sprayer in accordance with claim 27 in which said superstructure means is a unified structure removably attachable to said upwardly extending hollow mast.

29. A grove sprayer in accordance with claim 21 in which said boom arm assembly is an integral boom arm and flexible mounts means for unitary installation and removal of said boom arm.

30. In the combination of a grove sprayer having a wheeled vehicle having chemical tank and pump mounted thereon and a mast supporting a plurality of boom arms, the improvements comprising:

at least one hollow flexibly mounted boom arm mounted to said mast;

at least one nozzle mounting plate removably mounted to said hollow flexibly mounted spray boom arm;

at least one spray nozzle mounted in said nozzle mounting plate;

at least one nozzle control valve operatively connected to at least one spray nozzle for actuating said spray nozzle upon the actuation of said nozzle control valve;

actuating means attached to said nozzle control valve for actuating said valve, said actuating means having a nozzle control valve handle attached thereto and extending therefrom for actuating said valve;

spring means attached between said boom arm and said actuating means handle to actuate said nozzle control valve when said boom arm is deflected to move said actuating means handle; and at least one conduit affixed to said nozzle control valve on one end and operatively connected to the chemical tank and pump on the other end thereof whereby chemicals are fed to said spray nozzle.

* * * * *